United States Patent
Khan et al.

(10) Patent No.: US 10,646,863 B2
(45) Date of Patent: May 12, 2020

(54) APPARATUS FOR DISTRIBUTION OF CATALYST IN FLUIDIZED CATALYTIC CRACKING UNIT

(71) Applicant: Indian Oil Corporation Limited, Bandra (East), Mumbai (IN)

(72) Inventors: Shoeb Hussain Khan, Faridabad (IN); Vikas Badhan, Faridabad (IN); Venkata Hari Prasad Gupta Bandaru, Faridabad (IN); Gautam Thapa, Faridabad (IN); Satheesh Vetterkunnel Kumaran, Faridabad (IN); Debasis Bhattacharyya, Faridabad (IN); Sankara Sri Venkata Ramakumar, Faridabad (IN)

(73) Assignee: Indian Oil Corporation Limited, Bandra (East) (IN)

( * ) Notice: Subject to any disclaimer, the term of this patent is extended or adjusted under 35 U.S.C. 154(b) by 145 days.

(21) Appl. No.: 15/918,678

(22) Filed: Mar. 12, 2018

(65) Prior Publication Data
US 2018/0345267 A1    Dec. 6, 2018

(30) Foreign Application Priority Data
Jun. 3, 2017   (IN) .............................. 201721019552

(51) Int. Cl.
| | |
|---|---|
| *B01J 38/30* | (2006.01) |
| *B01J 8/26* | (2006.01) |
| *C10G 11/18* | (2006.01) |
| *B01J 8/18* | (2006.01) |
| *B01J 8/00* | (2006.01) |

(52) U.S. Cl.
CPC .............. *B01J 38/30* (2013.01); *B01J 8/003* (2013.01); *B01J 8/004* (2013.01); *B01J 8/0025* (2013.01); *B01J 8/1818* (2013.01); *B01J 8/26* (2013.01); *C10G 11/182* (2013.01); *B01J 8/1809* (2013.01); *C10G 2300/70* (2013.01)

(58) Field of Classification Search
CPC . B01J 38/30; B01J 8/003; B01J 8/1818; B01J 8/26; B01J 8/1809; C10G 11/182; C10G 2300/70
USPC .......................................................... 502/41
See application file for complete search history.

(56) References Cited

U.S. PATENT DOCUMENTS

| | | | |
|---|---|---|---|
| 5,635,140 A | 6/1997 | Miller et al. | |
| 5,773,378 A | 6/1998 | Bussey et al. | |
| 6,503,460 B1 | 1/2003 | Miller et al. | |
| 6,797,239 B1 | 9/2004 | Chen et al. | |
| 6,809,054 B1 | 10/2004 | Myers | |
| 8,349,753 B2 | 1/2013 | Santner et al. | |
| 2019/0001353 A1* | 1/2019 | Khan | B01F 3/0446 |
| 2019/0011126 A1* | 1/2019 | Gadari | F23J 13/00 |

* cited by examiner

Primary Examiner — Edward M Johnson
(74) Attorney, Agent, or Firm — Workman Nydegger

(57) ABSTRACT

A spent catalyst distributor for distributing spent catalyst in a catalyst regenerator vessel housing a dense phase catalyst bed and a dilute phase catalyst bed. The spent catalyst distributor comprises a conduit comprising a proximal end and a distal end. The conduit projects horizontally or horizontally and downwardly into the regenerator vessel and includes an opening located at the distal end for introducing the spent catalyst at a first location inside the regenerator vessel. The conduit further includes a plurality of orifices located along a length of the conduit between the distal end and an inner wall of the regenerator vessel for introducing the spent catalyst at a plurality of locations inside the regenerator vessel.

14 Claims, 14 Drawing Sheets

APPARATUS FOR DISTRIBUTION OF CATALYST IN FLUIDIZED CATALYTIC CRACKING UNIT

FIELD OF THE INVENTION

The present subject matter relates to a spent catalyst distributor for distributing spent catalyst.

BACKGROUND OF THE INVENTION

Spent catalyst distributors are known for many years. In the Fluidized Catalytic Cracking (FCC) process, the catalyst comes in contact with atomized heavy hydrocarbon molecules in the riser. In the riser, at high temperature, cracking occurs and coke gets deposited on the catalyst. Thereafter, the catalyst enters into stripper for removing the entrapped hydrocarbons inside the catalyst pores. The coke laden catalyst leaving the stripper is hereby being referred as "spent catalyst".

The coke on the spent catalyst, which covers the active sites on the catalyst and thereby substantially reduces the activity of the catalyst. It is possible, however, to remove the coke from the catalyst inside the regenerator by burning with air. The spent catalyst is fed into the regenerator through a "Spent Catalyst Distributor" (SCD) for uniform burning of the catalyst inside the Regenerator. In the Regenerator, at high temperature and in the presence of excess air, the coke deposited on the catalyst gets converted into CO, CO2. The regenerated catalyst with significantly lesser coke content is again being circulated to riser for cracking.

It is a known problem in the prior art that if the spent catalyst is not distributed into the regenerator in a uniform manner, the catalyst is not regenerated as efficiently, after-burning and the associated temperature increase in the dilute phase of the regenerator occurs, and $NO_x$, $SO_x$ are generated in undesirable amounts. Several past patents have attempted to resolve the deficiencies of the prior art distribution problems with varying degrees of success.

U.S. Pat. No. 5,773,378 discloses a device to distribute spent catalyst at the lower end of a spent catalyst standpipe. The standpipe enters the regenerator from the side wall, near the top of the bed level, conveying the catalyst through a horizontal conduit to the center of the regenerator, followed by a vertically downward conduit with a deflector plate end cap, and discharging catalyst through a plurality of discrete radial slots on the lower side wall of the vertical conduit.

U.S. Pat. No. 5,635,140 covers a self-aerating spent catalyst distributor to discharge catalyst radially and downwardly from a center-well via lipped trough arms into the catalyst bed. U.S. Pat. No. 6,503,460 describes a FCC regenerator countercurrent equipped with an internal baffle separating the dense phase of the fluidized bed in two parts. While the primary objective of the baffle is to reduce back mixing between the upper and lower sections of the fluidized bed. The baffles also facilitate the reduction in the diameter of the rising bubbles of gas passing through the dense bed, just before bursting at the surface of dense catalyst bed. This leads to reduction in the entrainment of catalyst.

U.S. Pat. No. 6,809,054 discloses a design of SCD distributor arrangement for introducing spent fluid catalytic cracking catalyst more uniformly across the dense bed of a regenerator to provide more even contact with regeneration gas in order to avoid hot spots and zones of incomplete combustion. In this design, a spent catalyst carrying arm extends out from the wall of the regenerator and extends towards the opposite wall. This invention also considers the use of aeration flow to fluidize the extended arm to assist catalyst flow. This patent also teaches that small arms can extend from the main arm at angles of 90° or 60°. However, this design, while not in the shape of a spooked wheel, also causes the catalyst to be distributed in the regenerator in a very uneven manner.

U.S. Pat. No. 6,797,239 covers a spent catalyst distributor design where spent catalyst and transport gases moves upwards via spent catalyst riser and diverted in a radial outward direction via a deflector cone. Such design of SCD cannot provide even distribution of spent catalyst across the regenerator shell.

U.S. Pat. No. 8,349,753 describes a bath tub type spent catalyst distributor which is half open and contains troughs and sub-troughs branched off the main trough for enhanced catalyst distribution. Down flow tubes are extended from the main trough and the sub trough for flow of catalyst. Such design of SCD works when the SCD is half filled. The catalyst overflows only from the top of SCD as the far end of the SCD is blocked.

The designs which are disclosed in the above prior art limits the distribution of the catalyst at a single location or the distribution limited to narrow portion of the regenerator.

SUMMARY OF THE INVENTION

This summary is provided to introduce a selection of concepts in a simplified format that are further described in the detailed description of the invention. This summary is not intended to identify key or essential inventive concepts of the claimed subject matter, nor is it intended for determining the scope of the claimed subject matter.

In an embodiment, a catalyst regenerator comprises a regenerator vessel and a spent catalyst distributor. The regenerator vessel includes an inner wall and an outer wall. Further, the regenerator vessel houses a dense phase catalyst bed and a dilute phase catalyst bed. The spent catalyst distributor may be installed on either of the lateral sides of the regenerator vessel and may be located above an interface of the dense phase catalyst bed and below an interface of the dilute phase catalyst bed.

The spent catalyst distributor includes a conduit having a proximal end and a distal end, an opening located at the distal end, and a plurality of orifices. The proximal end may be understood as an end of the spent catalyst distributor connected to a spent catalyst standpipe. The plurality of orifices is located along a length of the conduit between the distal end and the inner wall of the regenerator vessel. The length of the conduit between the distal end and the inner wall of the regenerator vessel includes a first circumferential portion and a second circumferential portion. The second circumferential portion is diametrically opposite to the first circumferential portion. A first set of orifices is located on the first circumferential portion and a second set of orifices is located on the second circumferential portion.

In another embodiment, a catalyst regenerator comprises a regenerator vessel and a spent catalyst distributor, the conduit includes an opening located at the distal end and a plurality of orifices. The plurality of orifices is located along a length of the conduit between the distal end and an inner wall of the regenerator vessel. In said embodiment, a diameter of the distal end opening is less than a diameter of the conduit, for instance, the opening may be in the form of a truncated cone shaped opening.

In another embodiment, a catalyst regenerator comprises a regenerator vessel and a spent catalyst distributor. The spent catalyst distributor includes a conduit having a proximal end and a distal end. The conduit further includes an opening, located at the distal end, and a plurality of orifices. The orifices are located along a length of the conduit between the distal end and an inner wall of the regenerator vessel. In said embodiment, the conduit is provided with one more extending arms such that the extending arms are provided on at least one of the plurality of orifices and protrude outwardly from the conduit. Further, the extending arms are directed inside the regenerator vessel. The extending arms may be placed in a manner such that a first extending arm is located on a first circumferential portion and a second extending arm is located on a second circumferential portion.

In another embodiment, a catalyst regenerator comprises a regenerator vessel and a spent catalyst distributor. The spent catalyst distributor includes a conduit having a proximal end and a distal end. The conduit further includes an opening located at the distal end and a plurality of orifices. The orifices are located along a length of the conduit between the distal end and an inner wall of the regenerator vessel. The conduit may be provided with at least one baffle such that the at least one baffle directs towards at least one of the plurality of orifices such that the at least one baffle can be located inside the conduit.

The advantages of the present invention include, but are not limited to, better spent catalyst distribution across the catalyst regenerator that improves coke burning in the catalyst regenerator thereby minimizing hotspots and localized catalyst deactivation. The present invention achieves a more effective regeneration and a cleaner regenerated catalyst.

BRIEF DESCRIPTION OF THE DRAWINGS

To further clarify advantages and aspects of the invention, a more particular description of the invention will be rendered by reference to specific embodiments thereof, which are illustrated in the appended drawings, wherein.

Figure 1A:
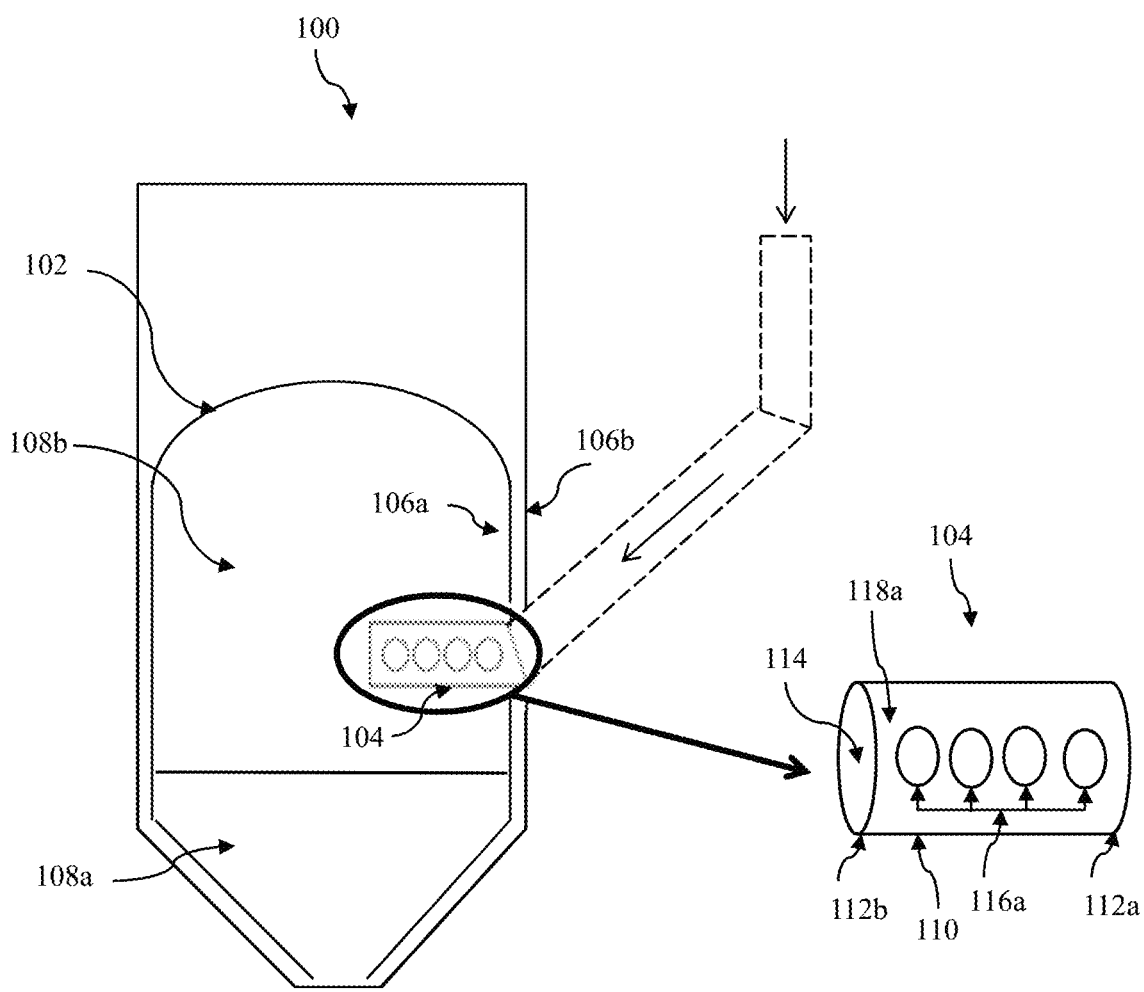
FIG. 1(a) illustrates a catalyst regenerator implementing a spent catalyst distributor, in accordance with an embodiment of the present invention.

It may be noted that to the extent possible, like reference numerals have been used to represent like elements in the drawings. Further, those of ordinary skill in the art will appreciate that elements in the drawings are illustrated for simplicity and may not have been necessarily drawn to scale. For example, the dimensions of some of the elements in the drawings may be exaggerated relative to other elements to help to improve understanding of aspects of the invention. Furthermore, the one or more elements may have been represented in the drawings by conventional symbols, and the drawings may show only those specific details that are pertinent to understanding the embodiments of the invention so as not to obscure the drawings with details that will be readily apparent to those of ordinary skill in the art having benefit of the description herein.

DETAILED DESCRIPTION OF THE INVENTION

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates. It will be understood by those skilled in the art that the foregoing general description and the following detailed description are explanatory of the invention and are not intended to be restrictive thereof.

Reference throughout this specification to "an aspect", "another aspect" or similar language means that a particular feature, structure, or characteristic described in connection with the embodiment is included in at least one embodiment of the present invention. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skilled in the art to which this invention belongs. The system, methods, and examples provided herein are illustrative only and not intended to be limiting. Embodiments of the present invention will be described below in detail with reference to the accompanying drawings.

FIG. 1(a) illustrates a catalyst regenerator 100 implementing a spent catalyst distributor, in accordance with an embodiment of the present invention. The catalyst regenerator 100, hereinafter, is interchangeably referred to as "regenerator 100". In an example, the regenerator 100 implements horizontal entry of catalyst and is used for regenerating spent catalyst.

In an example, the catalyst regenerator 100 comprises a regenerator vessel 102 and a spent catalyst distributor 104. As shown in the figure, the regenerator vessel 102 includes an inner wall 106a and an outer wall 106b. Further, the regenerator vessel 102 houses a dense phase catalyst bed 108a and a dilute phase catalyst bed 108b. In an example, the spent catalyst distributor 104 may be installed on either of the lateral sides of the regenerator vessel 102 and may be located above an interface of the dense phase catalyst bed 108a and below an interface of the dilute phase catalyst bed 108b.

The spent catalyst distributor 104 includes a conduit 110 having a proximal end 112a and a distal end 112b, an opening 114 located at the distal end 112b, and a plurality of orifices 116. The proximal end 112a, as described herein, may be understood as an end of the spent catalyst distributor 104 connected to a spent catalyst standpipe (shown by dotted lines). In an example, the proximal end 112a is adapted to receive spent catalyst from a stripper (not shown) of a fluid catalytic cracking (FCC) unit through the spent catalyst standpipe. In an example, the conduit 110 is cylindrical. As may be understood, the conduit 110 may be of other geometrical shapes suitable for implementation purposes.

In an example, the plurality of orifices 116 is located along a length of the conduit 110 between the distal end 112b and the inner wall 106a of the regenerator vessel 102. The length of the conduit 110 between the distal end 112b and the inner wall 106a of the regenerator vessel 102 includes a first circumferential portion 118a and a second circumferential portion 118b (not shown in the figure). The second circumferential portion 118b is diametrically opposite to the first circumferential portion 118a. In an example, a first set of orifices 116a is located on the first circumferential portion 118a and a second set of orifices 116b (not shown in the figure) is located on the second circumferential portion 118b. Furthermore, in an example, both, the first set of orifices 116a and the second set of orifices 116b include at least four orifices.

In an example, the orifices 116 are placed equidistantly from each other and a distance between two orifices, located adjacent to one another along the length of the conduit 110, is based on a distance between the distal end and proximal end, and catalyst flow rate.

Furthermore, in an example, a diameter of each of the plurality of orifices 116 is in the range of 40 to 60% of a diameter of the conduit 110. In another example, the diameter is in the range of about 50% of the diameter of the conduit 110. In operation, the proximal end 112a of the conduit 110 receives the spent catalyst from the stripper. Upon receiving the spent catalyst, the conduit 110 may project the spent catalyst horizontally at a plurality of locations inside the regenerator vessel 102. In an example, the conduit 110 projects the spent catalyst in a manner such that initially, a portion of the spent catalyst ejects out from the plurality of orifices 116 and thereafter, rest of the spent catalyst ejects from the opening 114 located at the distal end 112b. Thus, as described, the spent catalyst spreads across the regenerator vessel 102.

As will be appreciated, the arrangement of the aforementioned components is for understanding purposes and aspects of the present subject matter are not limited to the arrangement shown. Without limitation, aspects of the present subject matter may be implemented in current and alternate designs of FCC units.

Figure 1B:
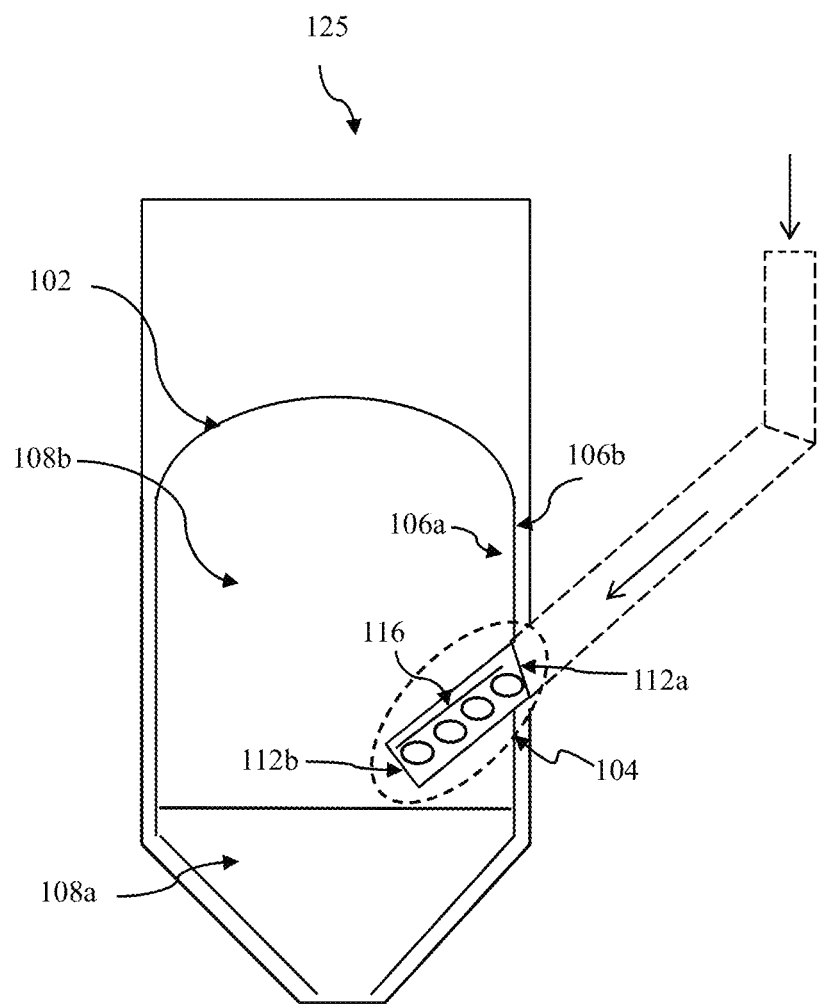
FIG. 1(b) illustrates a catalyst regenerator, in accordance with an embodiment of the present invention.

FIG. 1(b) illustrates a catalyst regenerator 125, in accordance with an embodiment of the present invention. In said embodiment, the catalyst regenerator 125 employs horizontal and downward entry of catalyst. Accordingly, in said embodiment, the spent catalyst distributor 104 is arranged in a manner so as to facilitate horizontal and downward entry of the catalyst.

In operation, the proximal end 112a of the conduit 110 receives the spent catalyst from the stripper. Upon receiving the spent catalyst, the conduit 110 projects the spent catalyst horizontally and downwardly at a plurality of locations inside the regenerator vessel 102. In an example, the conduit 110 projects the spent catalyst in a manner such that initially, a portion of the spent catalyst ejects out from the plurality of orifices 116. Thereafter, rest of the spent catalyst ejects from the opening 114 located at the distal end 112b. As may be gathered, owing to the arrangement of the spent catalyst distributor 104, angles of projection of the spent catalyst may vary from the angles of projection of the spent catalyst as described in FIG. 1a. However, the spent catalyst is well distributed across the regenerator vessel 102.

Figure 2:
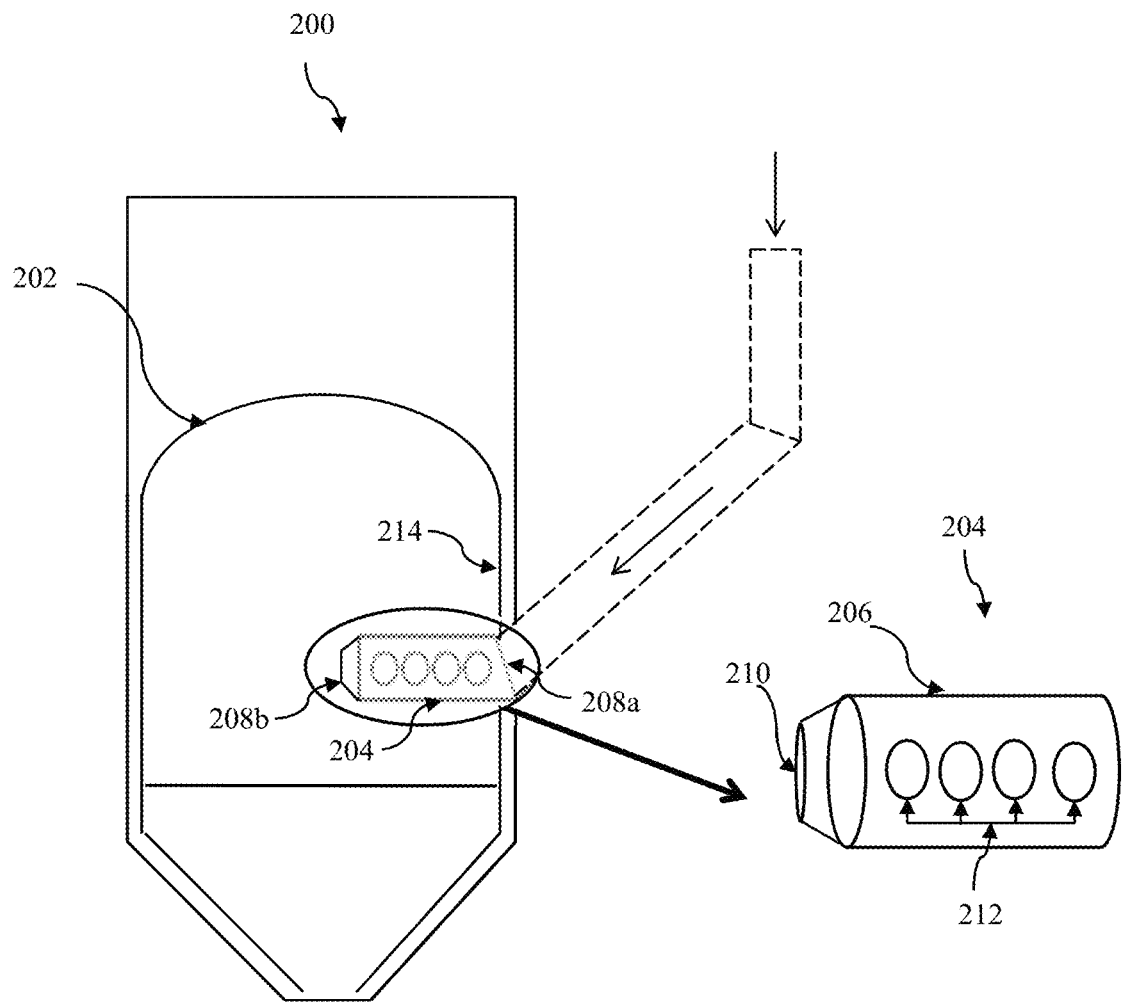
FIG. 2 illustrates a catalyst regenerator implementing a spent catalyst distributor, in accordance with another embodiment of the present invention.

FIG. 2 illustrates a catalyst regenerator 200 implementing a spent catalyst distributor, in accordance with another embodiment of the present invention. The catalyst regenerator 200 may interchangeably be referred to as regenerator 200.

Referring to FIG. 1(a) and FIG. 2, the constructional features and terminologies with respect to the catalyst regenerator 200 are analogous to the constructional features and terminologies with respect to the catalyst regenerator 100 detailed in FIG. 1(a).

In said embodiment, the catalyst regenerator 200 comprises a regenerator vessel 202 and a spent catalyst distributor 204. The spent catalyst distributor 204 includes a conduit 206 having a proximal end 208a and a distal end 208b. The conduit 206 further includes an opening 210 located at the distal end 208b and a plurality of orifices 212. The plurality of orifices 212 is located along a length of the conduit 206 between the distal end 208b and an inner wall 214 of the regenerator vessel 202.

According to an aspect of the present subject matter, in said embodiment, a diameter of the opening 210 is less than a diameter of the conduit 206. For instance, the opening 210 may be in the form of a truncated cone-shaped opening.

In an implementation, the conduit 206 projects the spent catalyst horizontally at a plurality of locations inside the regenerator vessel 202 in a manner such that initially, a portion of spent catalyst ejects out from the plurality of orifices 212. Thereafter, the rest of the spent catalyst ejects out from the opening 210.

In another implementation, the conduit 206 projects the spent catalyst horizontally and downwardly at a plurality of locations inside the regenerator vessel 202 in a manner such that initially, a portion of spent catalyst ejects out from the plurality of orifices 212. Thereafter, rest of the spent catalyst ejects out from the opening 210.

Figure 3:
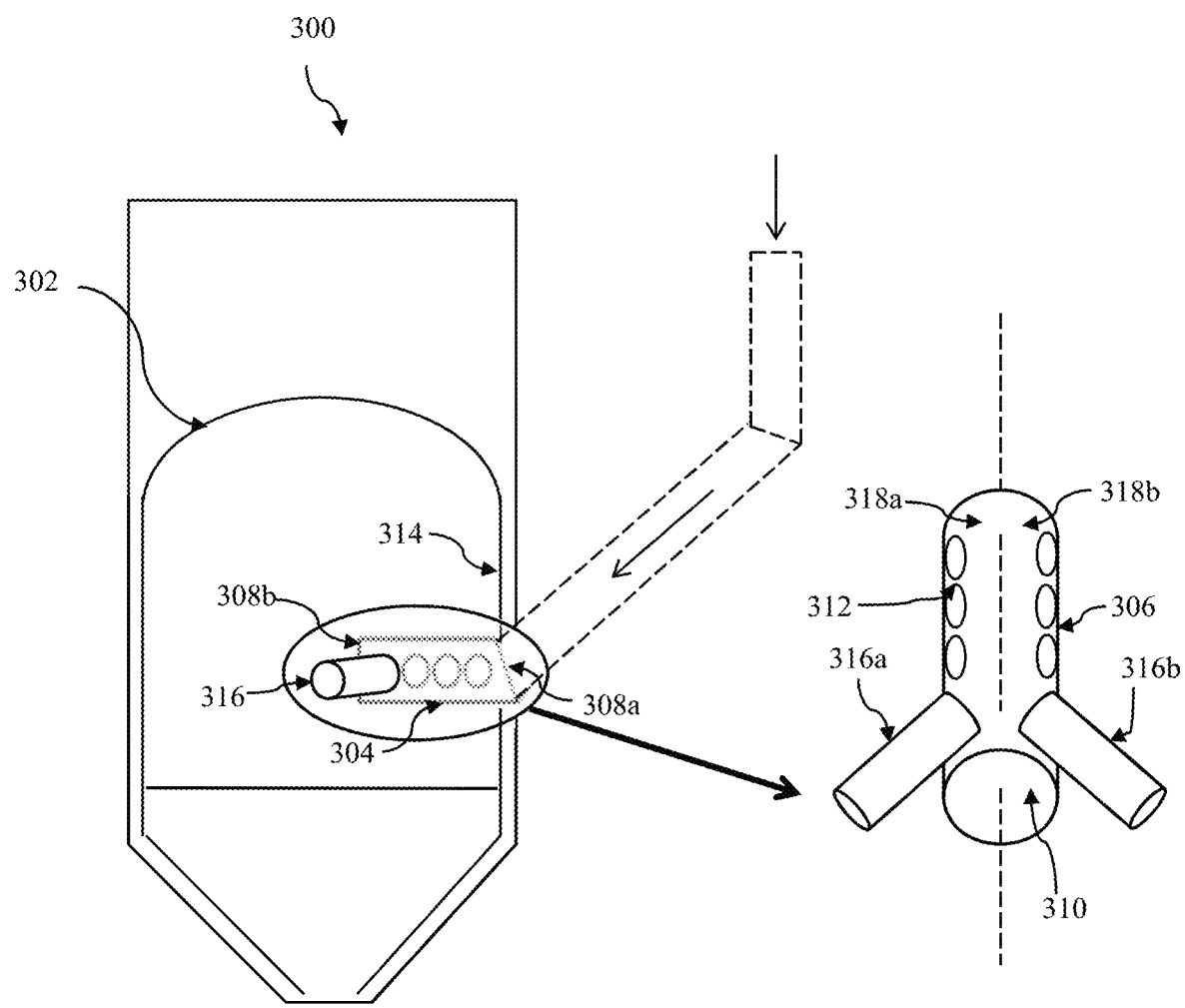
FIG. 3 illustrates a catalyst regenerator implementing a spent catalyst distributor, in accordance with another embodiment of the present invention.

FIG. 3 illustrates a catalyst regenerator 300 implementing a spent catalyst distributor, in accordance with another embodiment of the present invention. The catalyst regenerator 300 may interchangeably be referred to as regenerator 300.

Referring to FIG. 1(a) and FIG. 3 the constructional features and terminologies with respect to a catalyst regenerator 300 are analogous to the constructional features and terminologies with respect to the catalyst regenerator 100 detailed in FIG. 1(a).

In said embodiment, the catalyst regenerator 300 comprises a regenerator vessel 302 and a spent catalyst distributor 304. The spent catalyst distributor 304 includes a conduit 306 having a proximal end 308a and a distal end 308b. The conduit 306 further includes an opening 310, located at the distal end 308b, and a plurality of orifices 312. The orifices 312 are located along a length of the conduit 306 between the distal end 308b and an inner wall 314 of the regenerator vessel 302.

According to aspects of the present subject matter, as described herein in said embodiment, the conduit 306 is provided with one or more extending arms 316. In an example, the extending arms 316 are provided on at least one of the plurality of orifices 312 and protrude outwardly from the conduit 306. Further, the extending arms 316 are directed inside the regenerator vessel 302. In an example, the extending arms 316 may be placed in a manner such that a first extending arm 316a is located on a first circumferential portion 318a and a second extending arm 316b is located on a second circumferential portion 318b.

In an implementation, the conduit 306 projects the spent catalyst horizontally at a plurality of locations inside the regenerator vessel 302 in a manner such that initially, a portion of the spent catalyst ejects out from the extending arms 316 and the other plurality of orifices 312. thereafter, rest of the spent catalyst ejects out from the opening 310 located at the distal end 308b.

In another implementation, the conduit 306 projects the spent catalyst horizontally and downwardly at a plurality of locations inside the regenerator vessel 302 in a manner such that initially, a portion of the spent catalyst ejects out from the extending arms 316 and the other plurality of orifices 312. thereafter, rest of the spent catalyst ejects out from the opening 310 located at the distal end 308b.

Figure 4:
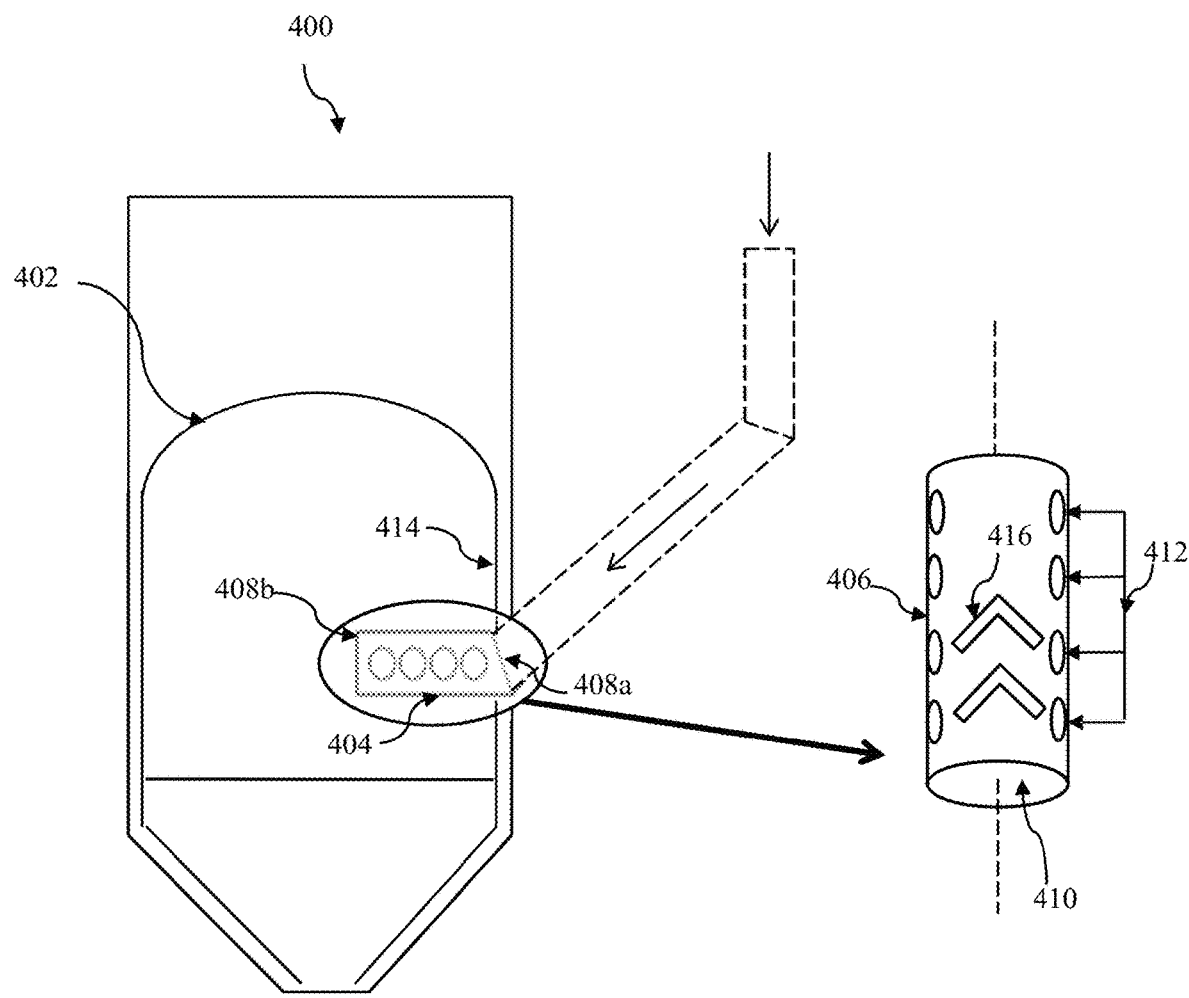
FIG. 4 illustrates a catalyst regenerator implementing a spent catalyst distributor, in accordance with another embodiment of the present subject matter.

FIG. 4 illustrates a catalyst regenerator 400 implementing a spent catalyst distributor, in accordance with another embodiment of the present subject matter. The catalyst regenerator 400 may interchangeably be referred to as regenerator 400.

Referring to FIG. 1(a) and FIG. 4 the constructional features and terminologies with respect to a catalyst regenerator 400 are analogous to the constructional features and terminologies with respect to the catalyst regenerator 100 detailed in FIG. 1(a).

In said embodiment, the catalyst regenerator 400 comprises a regenerator vessel 402 and a spent catalyst distributor 404. The spent catalyst distributor 404 includes a conduit 406 having a proximal end 408a and a distal end 408b. The conduit 406 further includes an opening 410 located at the distal end 408b and a plurality of orifices 412. The orifices 412 are located along a length of the conduit 406 between the distal end 408b and an inner wall 414 of the regenerator vessel 402.

According to aspects of the present subject matter, in said embodiment, the conduit 406 may be provided with at least one baffle 416. In an example, the at least one baffle 416 directs towards at least one of the plurality of orifices 412 such that the at least one baffle 416 can be located inside the conduit 406.

In an implementation, the at least one baffle 416 may direct the flow of the spent catalyst to the conduit 406. Subsequently, the conduit 406 projects the spent catalyst horizontally at a plurality of locations inside the regenerator vessel 402.

In another implementation, the at least one baffle 416 may direct the flow of the spent catalyst to the conduit 406. Subsequently, the conduit 406 projects the spent catalyst horizontally and downwardly at a plurality of locations inside the regenerator vessel 402.

As will be appreciated, the arrangement of the aforementioned components is for understanding purposes and aspects of the present subject matter are not limited to the arrangement shown. Without limitation, aspects of the present subject matter may be implemented in current and alternate designs of FCC units.

FIGS. 5(a)-5(i) illustrates an exemplary case study, in accordance with an embodiment of the present subject matter.

Figure 5A:
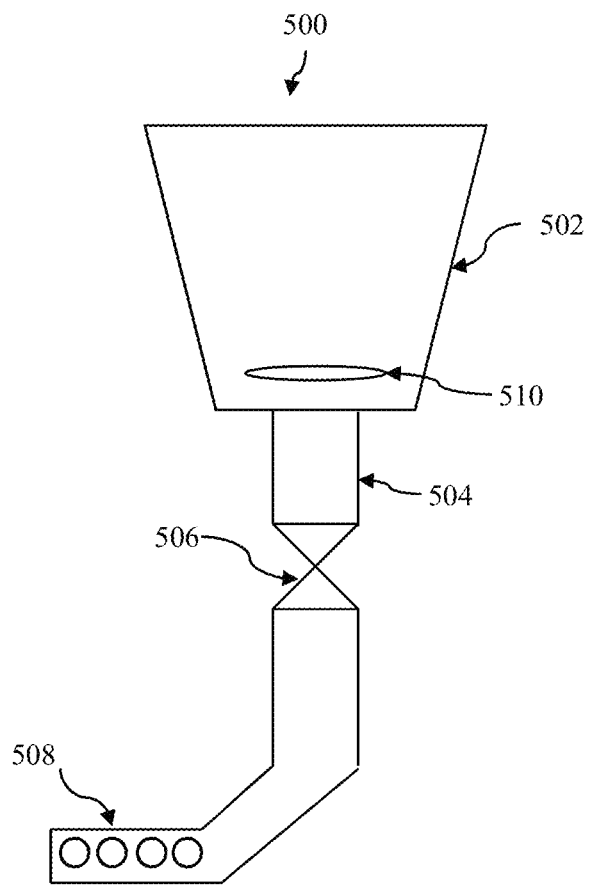
FIGS. 5(a)-5(i) illustrates an exemplary case study, in accordance with an embodiment of the present subject matter.

Referring to FIG. 5(a), an experimental apparatus 500 for the case study is shown that consists of a catalyst hopper 502, a spent catalyst standpipe 504, a valve 506 and a spent catalyst distributor 508. The catalyst hopper 502 is funnel-shaped and is connected to the spent catalyst standpipe 504 that leads to the spent catalyst distributor 508. The flow of spent catalyst traveling from the catalyst hopper 502 is regulated by the valve 506. In an example, the case study is performed without aeration facility.

In another example, the case study is performed with aeration facility provided in both the catalyst hopper 502 and the spent catalyst distributor 508, preferably at the bottom of the spent catalyst distributor 508. A ring type air distributor 510 is installed at the bottom of the catalyst hopper 502 and at the beginning of the spent catalyst standpipe 504 that ensures a minimum bubbling velocity in the catalyst hopper. For example, total fluidization air to ring air distributor varied from 20 to 50 l/min confirming a minimum bubbling velocity. The aeration flow in the catalyst hopper 502 and the spent catalyst distributor 508 is measured and controlled via rotameters. Further, a minimum fluidization velocity is maintained in the spent catalyst standpipe 504 with aeration facility.

To further quantify data using the experimental apparatus Computational Particle Fluid Dynamics (CPFD) simulation studies using Barracuda software was carried out. The parameters considered for the simulation studies are reproduced below in Table 1.

TABLE 1

| Parameters | Unit (kg/s) |
| --- | --- |
| Catalyst circulation rate, kg/s | 272 |
| Slippage of steam from stripper, kg/s @ 0.04 kmol/MT of catalyst circulation, | 0.192 |
| SCSP aeration, kg/s | 0.0488 |
| Total aeration, kg/s | 0.24 |

Figure 5B:
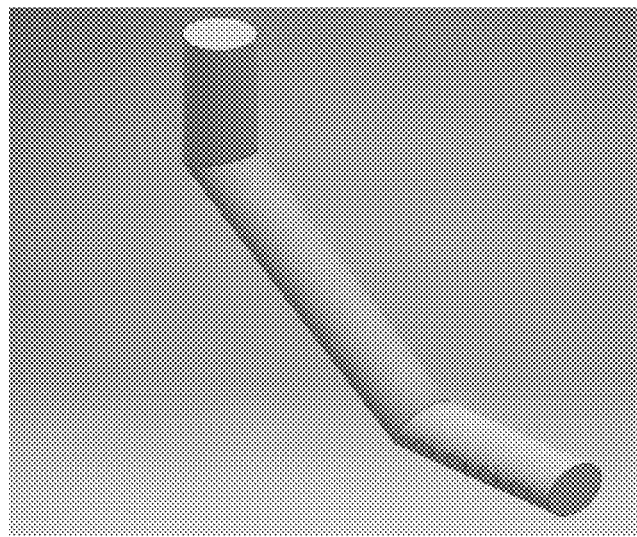

FIG. 5(b) shows a pictorial view of a first embodiment of a spent catalyst distributor employed in the simulation studies. The spent catalyst distributor has a cylindrical conduit comprising a proximal end, a distal end, an opening located at the distal end and four equidistantly placed orifices along the length of the cylindrical conduit. The four orifices include a first set of orifices and a second set of orifices present on both circumferential portions of the cylindrical conduit and are of equal diameter. The length of the spent catalyst distributor is 2.5 times diameter of the spent catalyst distributor. The data generated for the first embodiment is shown in Table 2.

TABLE 2

| | | Outlet | | | | |
| --- | --- | --- | --- | --- | --- | --- |
| Case Study | Opening wt % | Orifice no: 4 wt % | Orifice no: 3 wt % | Orifice no: 2 wtt % | Orifice no: 1 wt % | Inlet wt % |
| With bottom aeration | 63.5 | 3.9 3.8 | 5.0 4.7 | 5.0 4.7 | 4.7 4.7 | 100 |
| Without bottom aeration | 67.5 | 3.6 3.4 | 4.2 4.1 | 4.1 4 | 4.1 4.1 | 100 |

Simulation Results: From Table 2 it is observed that with no aeration in the bottom of the spent catalyst distributor, about 32% of spent catalyst is distributed through the four orifices and the rest from the opening located at the distal end. However, with aeration in the bottom of the spent catalyst distributor, about 36% of the spent catalyst is being distributed through the four orifices and 64% through the opening located at the distal end.

Figure 5C:
Figure 5D:
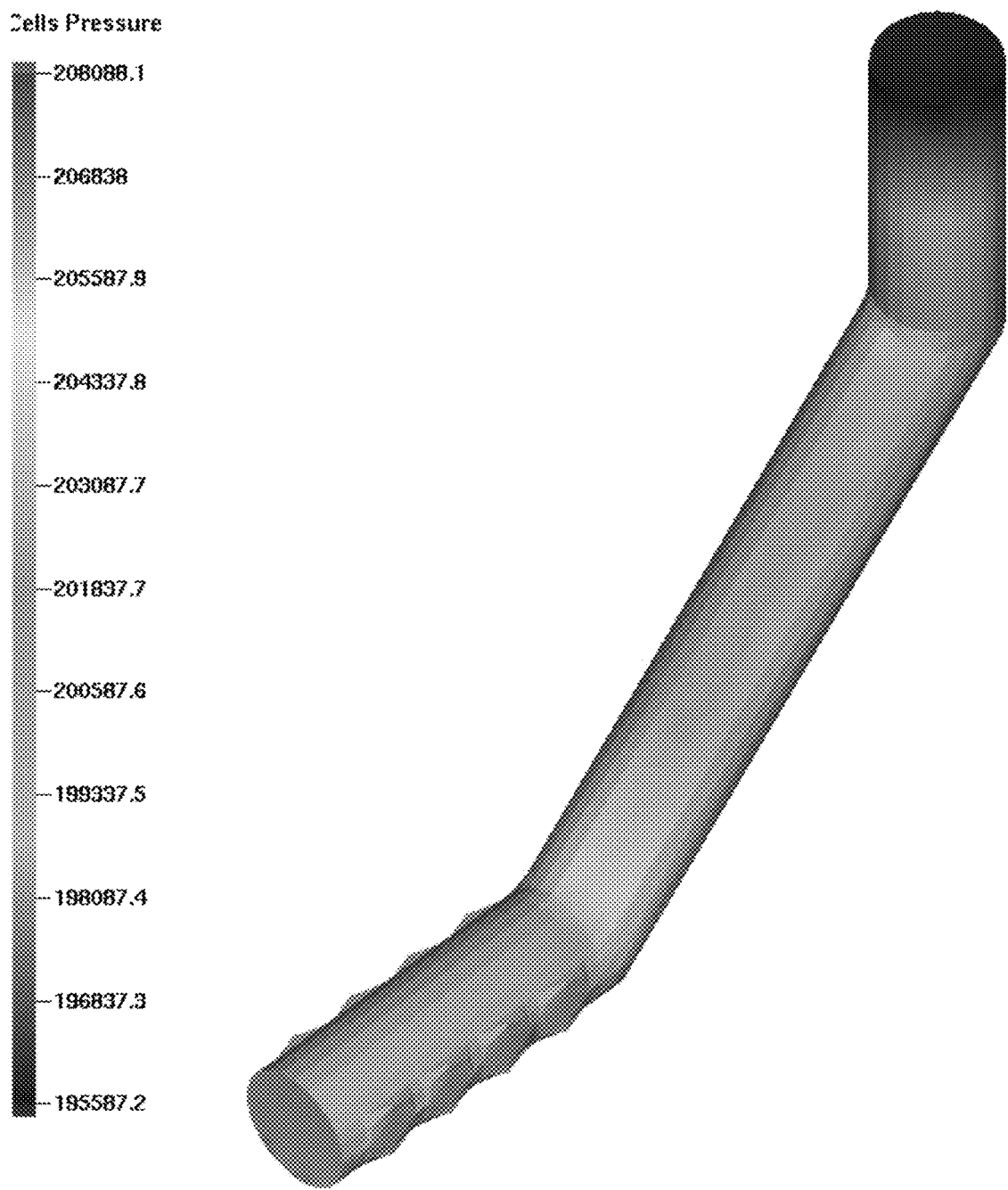

Referring to FIGS. 5(c) and 5(d), a pictorial view of a particle volume fraction and a pressure profile for the first embodiment of the spent catalyst distributor with aeration is shown. The particle volume fraction is uniform in the range of about 0.3-0.4 and the pressure build-up is negligible.

Figure 5E:
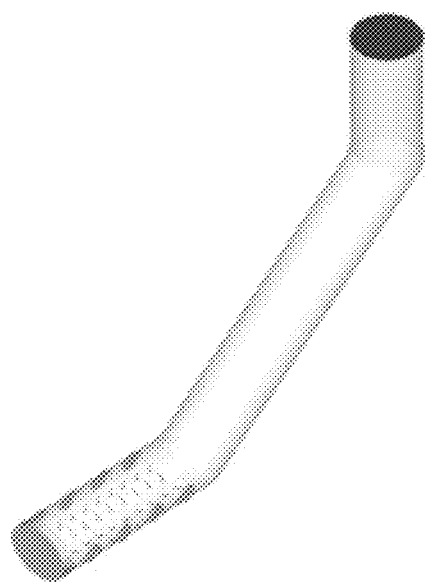
Figure 5F:
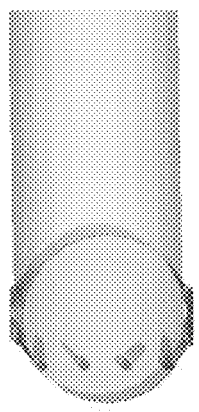
Figure 5G:
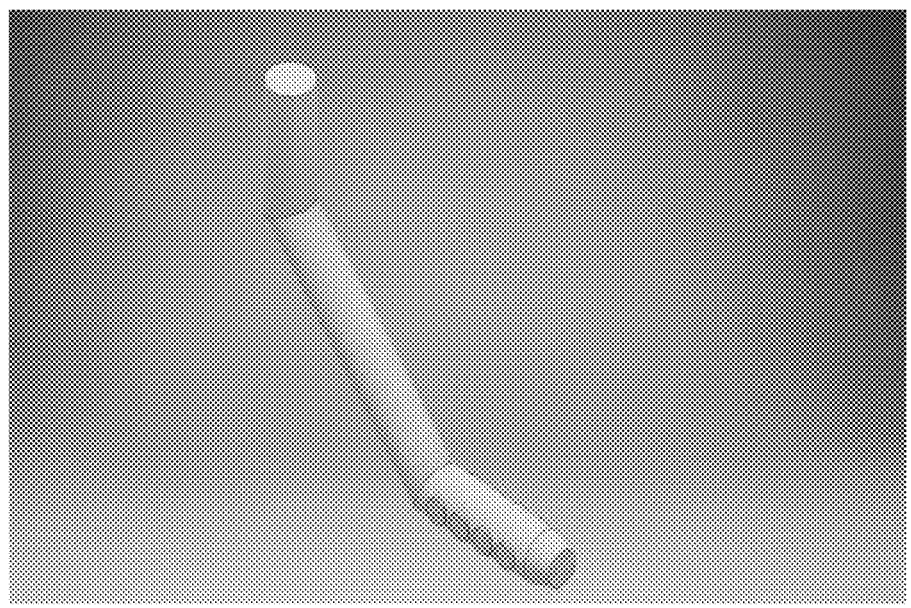

FIGS. 5(e)-5(f) illustrates an arrangement of aeration at the bottom of the first embodiment of the spent catalyst distributor. The aeration media may be air, nitrogen, steam etc or in any combination thereof. Referring to FIG. 5(g), a pictorial view of a second embodiment of a spent catalyst distributor employed in the simulation studies is shown. The spent catalyst distributor has a cylindrical conduit comprising a proximal end, a truncated conical end, an opening located at the truncated conical end and four equidistantly placed orifices along the length of the cylindrical conduit. The four orifices include a first set of orifices and a second set of orifices present on both circumferential portions of the cylindrical conduit and are of equal diameter. The length of the spent catalyst distributor is 2.5 times diameter of the spent catalyst distributor. The data generated for the first embodiment is shown in Table 3.

TABLE 3

| | Outlet | | | | | |
|---|---|---|---|---|---|---|
| Case Study | Opening wt % | Orifice no: 4 wt % | Orifice no: 3 wt % | Orifice no: 2 wt % | Orifice no: 1 wt % | Inlet % |
| With bottom aeration | 29.4 | 8.5 | 9.6 | 8.2 | 9.7 | 100 |
| | | 8.4 | 9.0 | 7.9 | 9.4 | |
| Without bottom aeration | 16 | 6.4 | 11.5 | 12.5 | 12.3 | 100 |
| | | 6.7 | 10.0 | 12.1 | 12.5 | |

Simulation Results: From Table 3 it is observed that with no aeration in the bottom of the spent catalyst distributor ~84% of the spent catalyst is distributed through the four orifices and the rest from the opening. However, with aeration in the bottom of spent catalyst distributor, about 70% of the spent catalyst is being distributed through the four orifices.

Figure 5H:
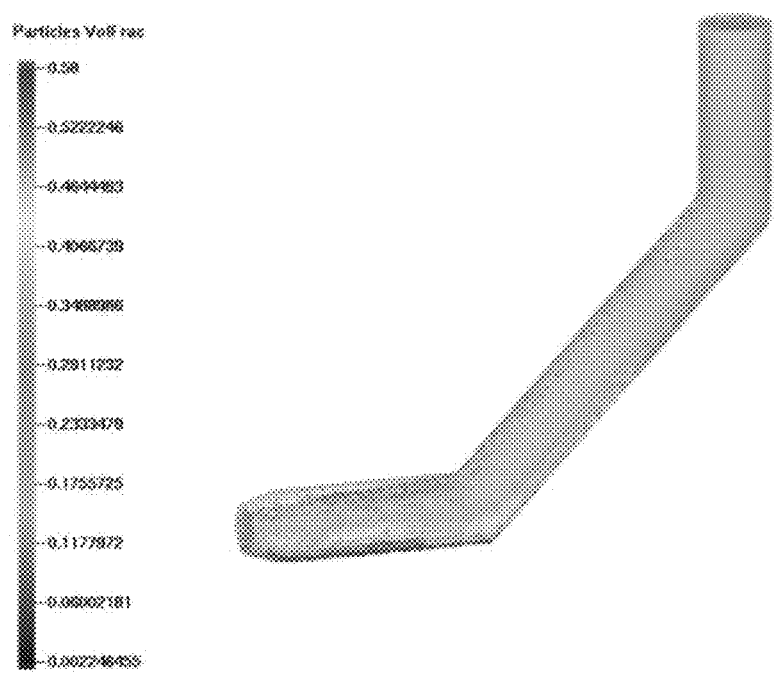
Figure 5I:
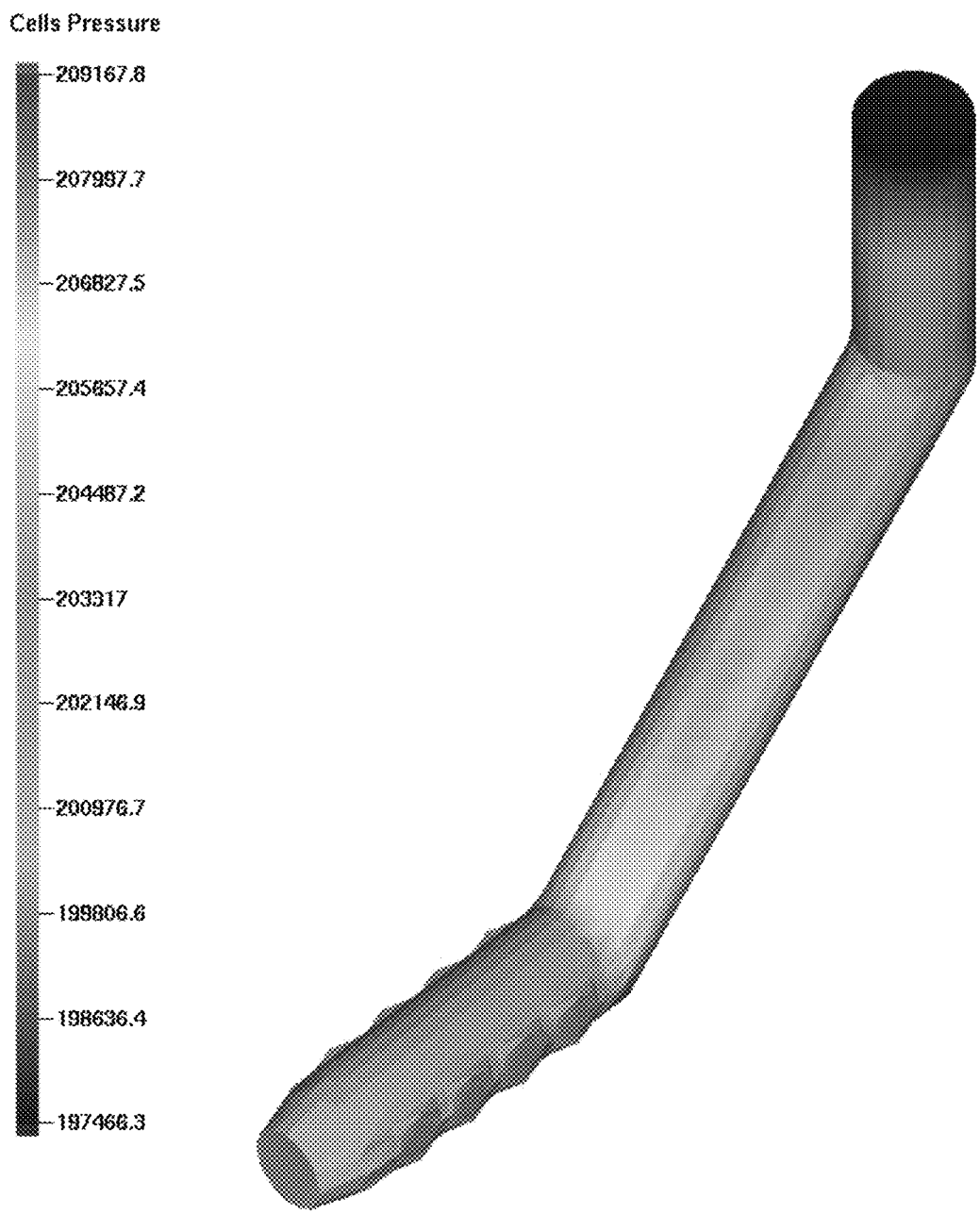

Referring to FIGS. 5(h) and 5(i), a pictorial view of a particle volume fraction and a pressure profile for the second embodiment of the spent catalyst distributor with aeration is shown. The particle volume fraction is in the range of about 0.35-0.45 and the pressure build-up is negligible. Based on the above simulation results, it can be concluded that both the first embodiment and the second embodiment are suitable for uniform distribution of spent catalyst with almost no catalyst hold up & negligible pressure buildup inside the catalyst regenerator.

While specific language has been used to describe the present subject matter, any limitations arising on account thereto, are not intended. As would be apparent to a person in the art, various working modifications may be made to the method in order to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

We claim:

1. A spent catalyst distributor for distributing spent catalyst in a catalyst regenerator vessel housing a dense phase catalyst bed and a dilute phase catalyst bed, the spent catalyst distributor comprising:
    a conduit projecting horizontally or horizontally and downwardly into the catalyst regenerator vessel, the conduit comprising:
        a proximal end;
        a distal end;
        an opening located at the distal end for introducing the spent catalyst at a first location inside the catalyst regenerator vessel; and
        a plurality of orifices located along a length of the conduit between the distal end and an inner wall of the catalyst regenerator vessel for introducing the spent catalyst at a plurality of locations inside the catalyst regenerator vessel.

2. The spent catalyst distributor as claimed in claim 1, wherein the conduit is located above an interface of the dense phase catalyst bed and below an interface of the dilute phase catalyst bed.

3. The spent catalyst distributor as claimed in claim 1, wherein the opening located at the distal end for introducing the spent catalyst at the first location is located above an interface of the dense phase catalyst bed and below an interface of dilute phase catalyst bed.

4. The spent catalyst distributor as claimed in claim 1, wherein each of the plurality of orifices located along the length of the conduit is located above an interface of the dense phase catalyst bed and below an interface of dilute phase catalyst bed.

5. The spent catalyst distributor as claimed in claim 1, wherein the plurality of orifices located along the length of the conduit comprises a first set of orifices located on a first circumferential portion and a second set of orifices located on a second circumferential portion, the second circumferential portion being diametrically opposite to the first circumferential portion.

6. The spent catalyst distributor as claimed in claim 5, wherein the length of the conduit between the distal end and the inner wall of the catalyst regenerator vessel comprises at least 4 orifices located on the first circumferential portion and at least four orifices located on the second circumferential portion.

7. The spent catalyst distributor as claimed in claim 1, wherein a diameter of the opening located at the distal end is lesser than a diameter of the conduit.

8. The spent catalyst distributor as claimed in claim 1, wherein a distance between two orifices located adjacent to one another along the length of the conduit is based on a distance between the distal end and the proximal end, and catalyst flow rate.

9. The spent catalyst distributor as claimed in claim 1, wherein the plurality of orifices located along the length of the conduit is placed equidistantly.

10. The spent catalyst distributor as claimed in claim 1, wherein at least one of the plurality of orifices located along the length of the conduit is provided with an outwardly extending arm.

11. The spent catalyst distributor as claimed in claim 1, further comprising at least one baffle provided within the conduit for directing a flow of the spent catalyst within the conduit towards at least one of the plurality of orifices located along the length of the conduit.

12. The spent catalyst distributor as claimed in claim 1, wherein each of the plurality of orifices located along the length of the conduit has a diameter in the range of 40 to 60% of a diameter of the conduit.

13. The spent catalyst distributor as claimed in claim 1, wherein each of the plurality of orifices located along the length of the conduit has a diameter in the range of about 50% of a diameter of the conduit.

14. A catalyst regenerator for regenerating spent catalyst, comprising:
- a catalyst regenerator vessel housing a dense phase catalyst bed; and
- a spent catalyst distributor, the spent catalyst distributor comprising:
  - a conduit projecting horizontally or horizontally and downwardly into the catalyst regenerator vessel, the conduit comprising:
    - a proximal end;
    - a distal end;
    - an opening located at the distal end for introducing the spent catalyst at a first location inside the catalyst regenerator vessel; and
    - a plurality of orifices located along a length of the conduit between the distal end and an inner wall of the catalyst regenerator vessel for introducing the spent catalyst at a plurality of locations inside the catalyst regenerator vessel.

* * * * *